United States Patent [19]

Palmer

[11] Patent Number: 4,898,501

[45] Date of Patent: Feb. 6, 1990

[54] IN LINE ROTARY DRILLING MACHINE FOR PRODUCING UNIFORM OPENINGS IN CONTINUOUS STRIP MATERIAL

[75] Inventor: Larry R. Palmer, Harriman, Tenn.

[73] Assignee: Tennessee Tool and Engineering, Inc., Oak Ridge, Tenn.

[21] Appl. No.: 366,758

[22] Filed: Jun. 14, 1989

[51] Int. Cl.⁴ ........................ B23B 39/20; B23B 41/00
[52] U.S. Cl. ........................................ 408/32; 408/34; 408/35; 408/49; 408/55; 408/67
[58] Field of Search ................... 408/8, 10, 32, 33, 34, 408/35, 49, 55, 61, 62, 67, 69, 702; 29/DIG. 79, DIG. 94, DIG. 102; 409/137

[56] References Cited

U.S. PATENT DOCUMENTS

| | | | |
|---|---|---|---|
| 984,792 | 2/1911 | Beehler | 408/34 |
| 1,044,564 | 11/1912 | Orth | 408/32 |
| 1,101,879 | 6/1914 | Orth | 408/32 |
| 3,877,831 | 4/1975 | Maroschak | 408/35 |
| 3,910,713 | 10/1975 | Maroschak | 408/35 |
| 4,219,293 | 8/1980 | Licht | 408/32 |

Primary Examiner—Daniel Howell
Attorney, Agent, or Firm—Pitts and Brittian

[57] ABSTRACT

A rotary drilling machine for forming holes of selected size and spacing in continuous strip material such as elastomeric gasket stock used for the manufacture of gaskets for door openings and the like. This machine has a rotary drum unit which carries the strip material along a portion of its peripheral edges. A plurality of drilling units are mounted on this drum unit so as to move with the strip material. The drilling units are oriented toward the peripheral edge, and these drilling units are moved radially in a proper sequence whereby drill bits thereof move toward the strip material to dril the holes and then retract. Tensioning elements produce friction between the strip material and the periphery of the drum unit to accomplish the movement thereof in unison. The tensioning elements, in a preferred form, have signal generating elements whereby the speed of rotation of the drum unit is controlled to prevent sag in the run of the strip material. The radial movement of the drilling units is preferably controlled with a cam and cam follower arrangement. Air for driving drilling motors and water for cooling the drill bits is fed to the machine through passageways in the drive shaft for the drum unit. The construction of this machine provides for very accurate drilling of the holes, and a high rate of production with very little maintenance.

20 Claims, 6 Drawing Sheets

IN LINE ROTARY DRILING MACHINE FOR PRODUCING UNIFORM OPENINGS IN CONTINUOUS STRIP MATERIAL

FIELD OF INVENTION

This invention relates generally to automatic drilling machines, and more particularly to a machine for automatically and continuously producing openings of a selected uniform diameter and spacing in continuous strip material, e.g., producing vent openings in elastomeric gasket materials such as those utilized for producing gaskets for vehicle doors and the like.

BACKGROUND ART

The elastomeric gaskets utilized to seal doors, trunk lids etc. of vehicles are constructed with a "carrier" portion and an integral "bubble" portion. The carrier portion provides a surface for attachment to the frame surrounding the opening to be closed by the door or lid, and the bubble portion provides for the cushioning action of the gasket. However, to be effective in this cushioning, the bubble portion typically is provided with vent openings at selected spacings along the length of the gasket material. These vent openings are typically produced in the bulk gasket material prior to the forming of gasket elements of a particular configuration. For example, one of the most common vent configuration is a vent size of 0.165 in., and a spacing of 6 inches. In order to have uniformity of action of the gaskets, the specifications for the vents call for very precise hole size and spacing. Typically the size of the hole must be within ± 0.005 inches and the spacing must be within ±0.015 inches.

In order to produce the vent holes in the bulk gasket material, it has been common practice to feed a continuous body of gasket material through a drilling machine. Typically, this prior art machine has utilized two high-speed drilling units set apart at the given spacing. These drilling units are reciprocated (advanced, and then withdrawn) orbitally at a high rate of speed while the gasket material is fed past the drilling units. Typically about one second is required to drill these two holes. However, even with the high-speed advancing and withdrawing of the drills, the holes often have an oval configuration rather than being round. When this non-uniformity is excessive the material must be discarded. Further, the high speed operation produces significant wear on the components and the drilling units must be overhauled on at least a weekly basis. This requires either a significant "down time" or a plurality of processing lines. When the units are functioning satisfactorily the bulk gasket material can be processed at a maximum of about 60 feet per minute.

Accordingly, it is an object of the present invention to provide a drilling machine to produce uniform openings in strip material.

It is another object of the present invention to provide a drilling machine for producing the vent holes in gasket material wherein the bulk material can be processed at a substantially higher rate than with drilling units of the prior art.

Another object of the present invention is to provide a rotary drilling unit whereby drilling of the vent holes progresses as the gasket material moves through the machine, the drilling achieving round vent holes at a uniform spacing.

A further object of the present invention is to provide a drilling unit thereby maintenance thereof is only at extended periods of operation in contrast to those of the prior art.

These and other objects of the present invention will become apparent upon a consideration of the drawings which follow together with the detailed description thereof in connection with the operation of the invention.

SUMMARY OF INVENTION

In accordance with the present invention, there is provided a rotary drilling machine for producing vent holes in the bubble portion of a continuous gasket material or other continuous bulk strip material. This drilling machine carries the gasket material on a rotating drum, with a plurality of drilling units mounted on the drum so that drills move with the bulk material whereby the drills enter and leave the gasket material without causing the formation of oval vent openings. The drills are advanced and withdrawn through the operation of a rotary cam means attached to the drum and the cooperative action of cam follower means associated with each of the plurality of drilling units. Preferably the drill units are operated with air-driven motors, and a stream of water is used to cool the drills and to wash drilling debris from the gasket material. Preferably the air for the motors, as well as the water, is provided through axial passageways in the shaft utilized for the rotation of the drum means.

DETAILED DESCRIPTION OF THE INVENTION

Figure 1:
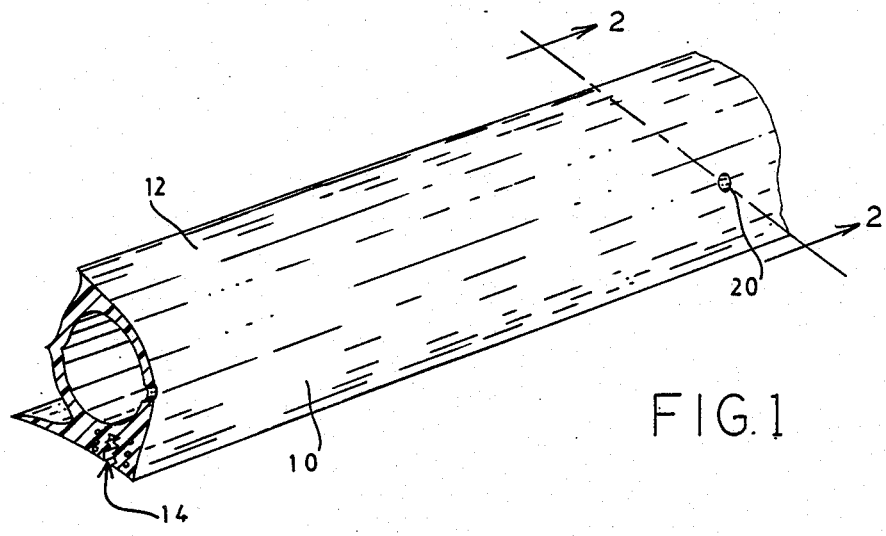
FIG. 1 is a drawing illustrating a typical gasket material that can be processed in the machine of the present invention.
Figure 2:
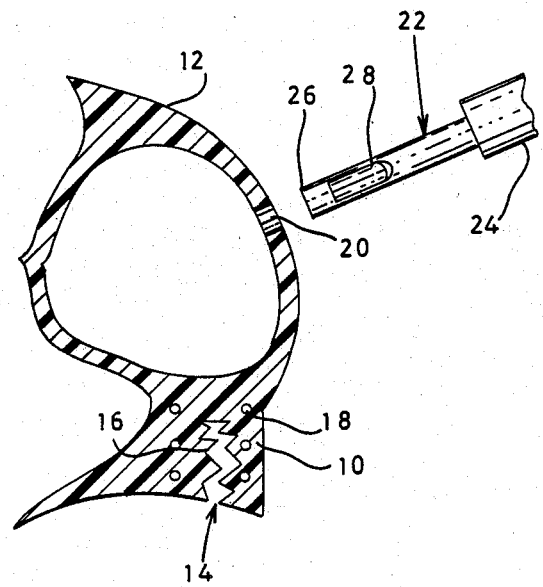
FIG. 2 is an enlarged cross-sectional drawing of the gasket material of FIG. 1 taken at 2—2 thereof.

A typical gasket material as utilized for automobiles, etc. is illustrated in FIG. 1 and in the enlarged cross-section in FIG. 2. This gasket material has a "carrier" portion 10 for attachment to the vehicle proximate an opening to be closed with a door or lid, and a hollow "bubble" portion 12 that compresses to provide a seal. In this embodiment of gasket material, there is a longitudinal groove 14 that will engage a flange-like projection (not shown) at the position for attachment of the gasket. This groove typically can have serrated side walls 16 to grasp the flange. Furthermore, the gasket material typically has longitudinal reinforcing wires 18 or the like to give stiffness to the gasket. In order that this bubble can properly cushion and seal, it is provided with a plurality of vent holes as at 20. These vent holes are typically of the order of 0.15 to 0.20 inches in diameter and typically spaced apart about 4 to 12 inches. The vent holes of a particular vehicle manufacturer are 0.165 in. in diameter, and have a 6 inch spacing.

FIG. 2 also depicts a typical commercial drill bit 22 used for the creation of the vent holes 20. This bit has a shank portion 24 for mounting in the drill motor (see discussion of FIGS. 5 and 7), and the cutting end 26 is hollow so as to permit the cut portion of the gasket material to feed through and exit a side slot 28.

Figure 3:
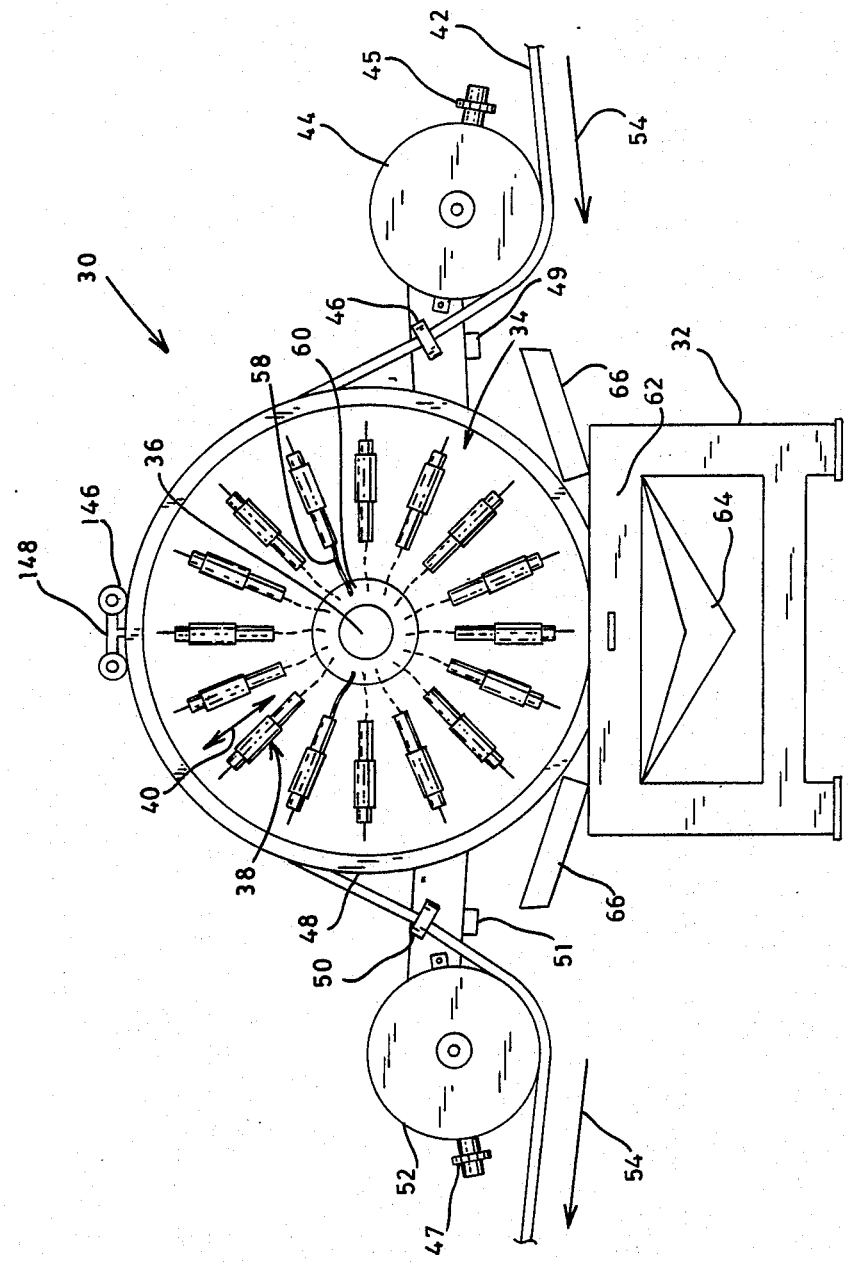
FIG. 3 is a frontal view of an embodiment of drilling machine of the present invention illustrating the continuous bulk gasket material as being fed over the drum means thereof with a plurality of drilling units mounted on the drum means.

Illustrated generally at 30 in FIG. 3 is a rotary drilling machine of the present invention that will produce the vent openings in the gasket material as illustrated in FIGS. 1 and 2. Mounted upon a frame member 32 is a rotatable drum means 34 which is rotatable about a substantially horizontal axis 36 (see FIG. 4). Mounted upon the drum means 34, in radial orientation, are a plurality of drilling units 38 that are adapted to be moved radially, as indicated by the double ended arrow 40, for the purpose described hereinafter. A continuous run of bulk gasket material 42 is caused to be withdrawn from a storage unit (not shown) to pass under a first "idler" wheel 44 and thence through a guide means 46 so as to pass along a periphery 48 of the drum means 34. The run continues through a second guide means 50 and past a second idler wheel 52 to a product storage bin or the like (not shown). Motion of the drum, and thus the gasket material, is indicated by the arrow 54. The idler wheels 44 and 52 are provided with counter-weight means 45, 47 so as to displace these wheels sufficiently to provide tension to the gasket material so it closely conforms to the drum periphery 48. Typically the pivotal mounting means associated with the idler wheels are provided with position sensing means 49, 51, such as potentiometers, whereby electrical signals can be derived to control the rate of feed of the gasket material 42 as well as the speed of rotation of the drum means 34.

The diameter of the drum means 34, which determines the linear dimension of the periphery 48 thereof, and the position of the drilling units 38 determine the spacing between vent holes in the gasket material. As stated above, a typical spacing is 6 inches. With the outer diameter of about 30.5 inches, and an angular spacing of the drilling units of fifteen degrees, this vent hole spacing can be achieved with satisfactory accuracy. With the same dimensions of the drum means, alternate drilling units 38 (or their drill bits 22) can be removed to achieve holes with a twelve inch spacing if such is desired.

As stated above, the drilling units 38 are caused to move reciprocatively in a radial direction. Typically these drilling units incorporate an air-driven motor (see FIGS. 4, 5, 7). These motors are supplied with compressed air through the rotatable support shaft 56 of the drum means 34 (see FIG. 5), and through a flexible hose 58. The individual flexible hoses for the various drilling units connect to a central hub 60.

Figure 5:
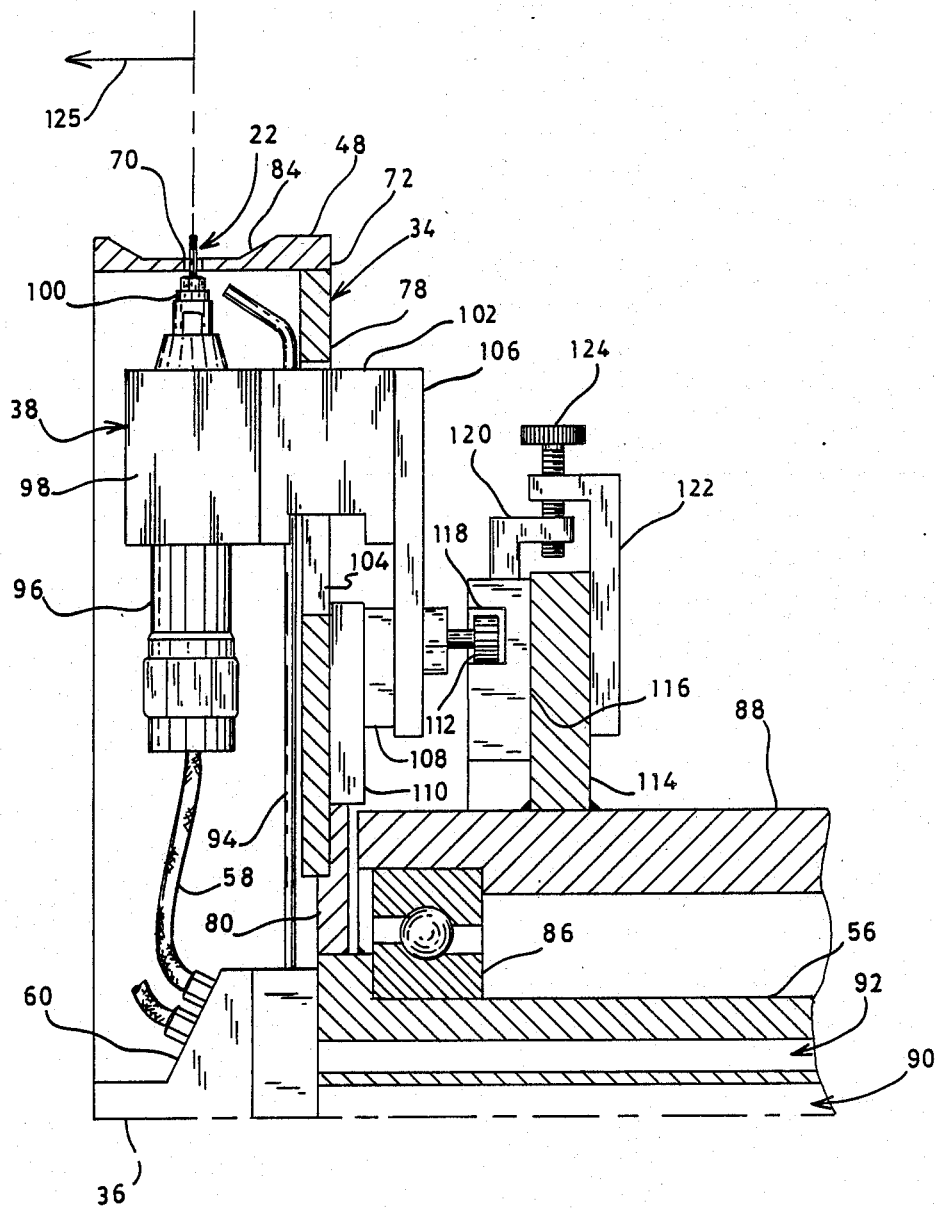
FIG. 5 is a cut-away drawing, partially in cross-section, showing the means for the reciprocating of the drilling units on the face of the drum means for advancing and withdrawing the drills from the gasket material as the drum means is rotated.

The debris (i.e., the gasket pieces) created by the drilling of the vent holes drops by gravity to the lowest portion of the drum means 34. As indicated in FIG. 5, the drum means can be tilted so as to be in an inclined position whereby this debris is more easily removed. Furthermore, a small stream of water is directed against the drill bit at the point of drilling (see FIG. 5). This water is also carried to the bottom of the drum. These waste materials are typically deposited in a pan-type drawer 62 mounted in the frame 32, with the water and solid debris being separated using a screen or the like. The waste water, via a hopper 64, can be carried to a floor drain or the like (not shown). Periodically the drawer 62 is cleaned of the solid debris. The collection of the waste is aided with various splash shields and/or baffles 66 mounted from the frame 32. Typically there is a removable cover (not shown) that mounts from the hub 60 to prevent excessive splashing and assist in directing the waste materials into the collection mechanism.

Figure 4:
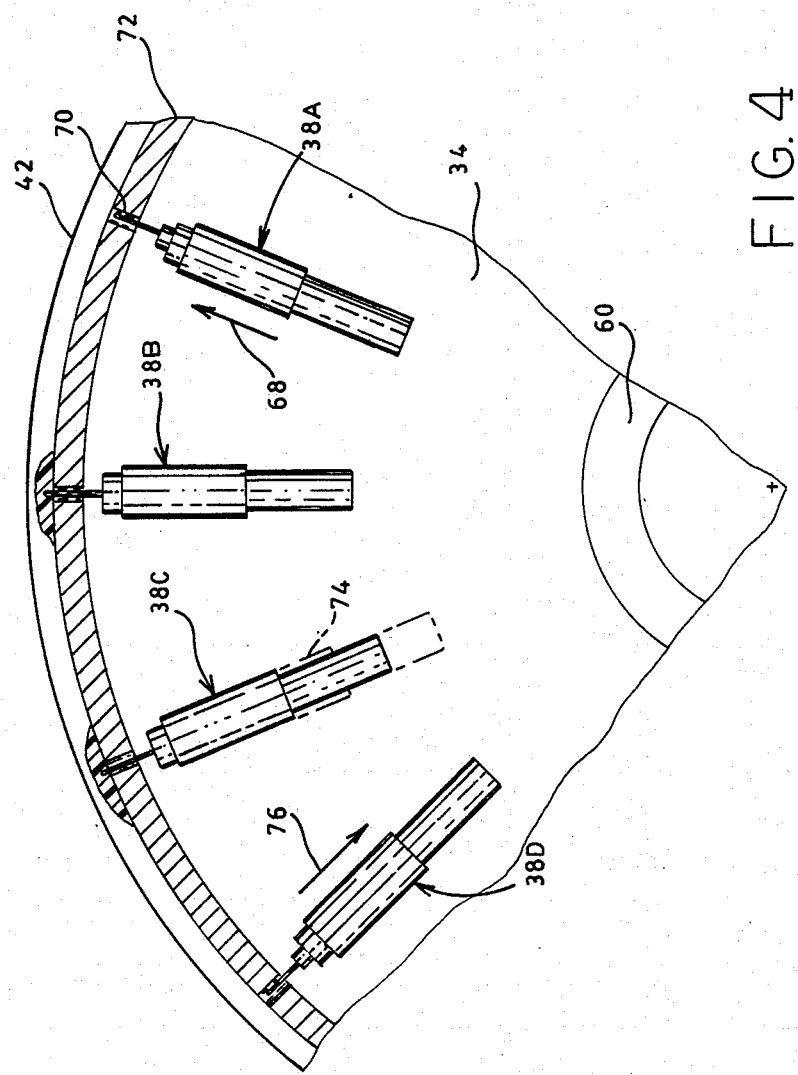
FIG. 4 is a cut-away portion of the drum means of FIG. 1 illustrating the operation of the drilling units for advancing and withdrawing from drilling positions.

The mechanical functioning of the drilling units of the present invention can be further understood by referring to FIG. 4. This is an enlarged drawing of a portion of the drum means 34 of FIG. 3 in which a portion of the drilling units 38 are shown, with some in slightly different radial position. The gasket material 42 is cut away at two of the drilling positions so as to show the penetration of the drill bit through the wall of the bubble portion. For example, drill unit 38A has been moved radially, as indicated by arrow 68, from a retracted position (by means described re FIG. 5) to place the drill bit thereof in drilling position. The drill bit has passed through an aperture 70 in the rim 72 of the drum means. At the same time, drill unit 38B has been moved to a maximum radial position whereby its drill bit has penetrated the wall of the gasket bubble portion. Likewise, drill unit 38C is at a maximum radial position for drilling (the withdrawn position is indicated with phantom lines at 74). The fourth drill unit depicted in this FIG. 4 (drill unit 38D) is beginning to retract as indicated by arrow 76. In actual practice, drilling is conducted from about the two o'clock position to about the ten o'clock position as viewed from the front of the drum means.

Means for rotating the drum means 34 and reciprocating the drill units 38 are illustrated in FIG. 5. It can be seen that the drum means 34 is made up of a disk-like plate 78 mounted from a flange 80 attached to the drive shaft 56. Further, there is the hoop-like member 72 that defines the outer periphery 48. This hoop member is provided with a contour 84 that is shaped to closely conform to the contour of the gasket material to support the gasket material as the drilling is achieved. The hoop member can be replaced to change the support contour for specific applications. The shaft 56, supported by appropriate bearings 86, rotates within a fixed housing 88 supported from the frame 32. Rotation of the shaft 56 is accomplished with any suitable drive means (not shown) which, in a preferred form, provides for variable speed to accomplish proper handling of the gasket material. As stated above, speed control is effected from a signal derived from the mechanism associated with the idler wheels. This shaft 56 is provided with an axial passageway 90 for the passage of compressed air for the operation of the drill units 38, and with a second passageway 92 for conveying water to flush tubes 94 that deliver the water to the drilling point of each drilling unit. As stated above, this water cools the drill bit 22 and assists in flushing solid debris from the cutting area. The water and air are directed to the tube 94 and hose 58, respectively, by internal construction within the hub 60.

Figure 7:
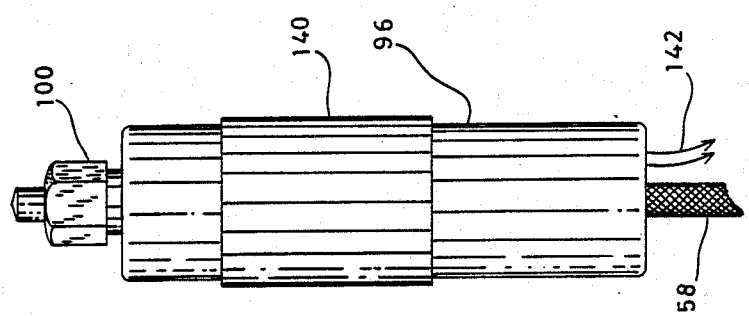
FIG. 7 is a drawing showing a typical air motor used with the present invention as adapted to fit in the holder of FIG. 6.
Figure 6:
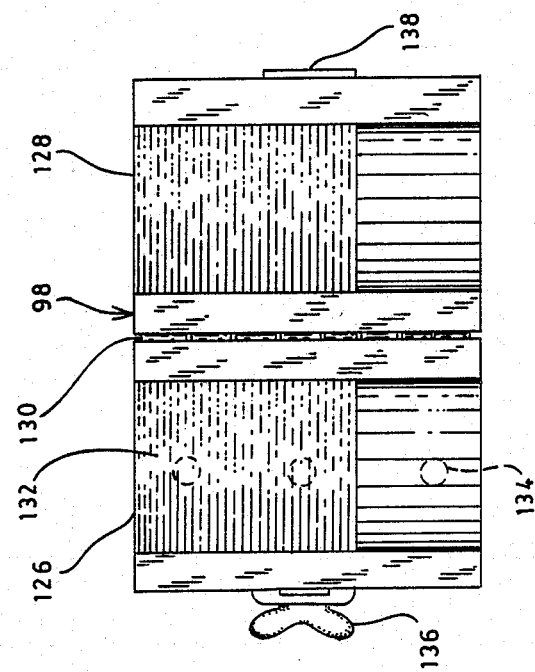
FIG. 6 is a drawing of the air motor holder of FIG. 5 showing a typical means for locking the same to enclose an air motor.

The drilling unit 38 includes a suitable commercial air-driven motor 96 held in a suitable enclosure 98 (see FIGS. 6 and 7). The motor is provided with a collet 100 for releasably grasping the drill bit 22. The enclosure of each drilling unit 38 is mounted on an arm member 102 that passes through a corresponding radial slot 104 in the plate 78 where the arm is attached to an operator member 106. This operator member carries one portion 108 of a linear slide bearing, with the complimentary portion 110 of the bearing being mounted on the rear surface of the plate 78. Also, the operator member carries a roller-type cam follower 112. Adjustably mounted upon a flange 114, which is attached to the housing 88, is a cam member 116 (see FIG. 8) having a cam surface defined by a recess 118 therein. It is within this recess that the cam follower 112 is disposed. The cam member carries positioning legs 120 at selected positions that cooperate with mounting brackets 122 attached to the flange 114. An adjustment screw 124 associated with the legs and brackets causes the legs to be properly positioned with respect to the brackets whereby the cam member is properly positioned for the radial motion of the drilling units 38. It will be understood that other means can be used to achieve radial movement of the drilling units.

As referred to above, the drum means 34 can be tilted as indicated by the arrow 125. This is accomplished by pivoting the housing 88 with respect to the frame 32. This tilting provision serves several purposes. Already discussed is the advantage for the removal of the solid debris and the water from the drilling operation. In addition, this tilting can be used to better accommodate bulk materials of various surface contours. This tilting has no affect upon the operation of the components of the drilling machine.

Illustrated in FIGS. 6 and 7, in combination, are the components of a preferred drilling unit 38. The air motor holder 98 is formed with a pair of cooperating clam shell units 126, 128 that are pivotally connected with a hinge member 130. The interior of these clam shell units define hemi-cylindrical surfaces, with at least a portion of each having circumferential ridges 132. One of the clam shell units (e.g., unit 126) is typically provided with threaded recesses 134 whereby this unit can be attached to the aforementioned arm 102 (see FIG. 5). A quick release mechanism, as depicted by the components 136, 138 is provided for the rapid changing of a drill motor 96 should such be required. An elastomeric sleeve 140 is placed upon the drill motor so as to provide grasp by the ridges 132 to prevent axial motion of the motor 96 relative to the holder 98. A typical air motor for this application is Model No. 201A manufactured by Air Turbine Technology, Inc. of Boca Raton, FL. This particular motor discharges air from the base thereof, as at 142, so that only feed line 58 is required. For motors that have a separate discharge line, this also would be connected to the aforementioned hub 60 to then discharge the air using a muffler (not shown), if desired.

Figure 8:
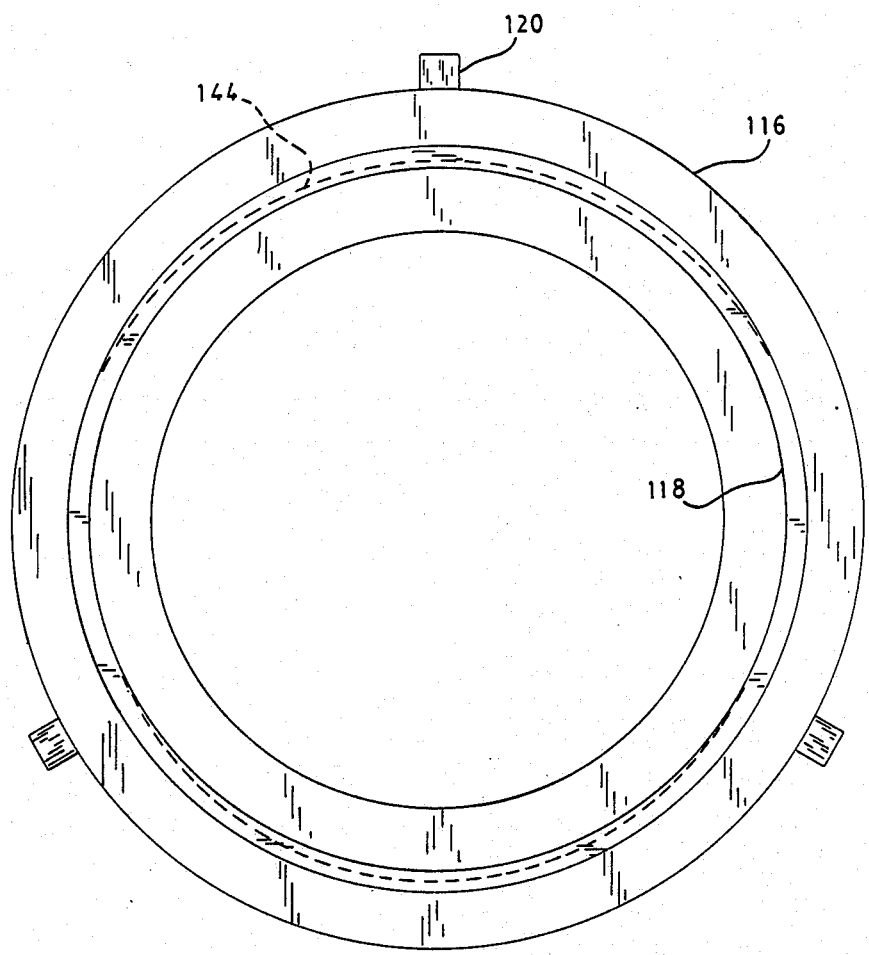
FIG. 8 is a drawing illustrating a cam unit for use in moving the mechanisms, as shown in FIG. 5, in a reciprocating motion to accomplish radial motion of the drilling units.

The cam surface for radial movement of the drilling units is contoured whereby the drilling units are at their most radially-disposed position during the preferred drilling cycle, but are withdrawn to permit withdrawal of the gasket material from the periphery of the drum means. This is depicted in FIG. 8. The cam member 116 is generally ring-like, with typically a circular outer periphery. The recess 118 cut into the face thereof, however, is not perfectly circular (the pure circular orbit is indicated with the dashed line at 144). The contour is arranged (lobed) so that drill bits are engaged with the gasket material over about the upper one-third of the periphery 48 of the drum means 34, and fully withdrawn during the lower one-third. Thus, the contour is generally egg-shaped. Of course, other configurations of the cam can be used to achieve a particular pattern to the movement of the drilling units.

Referring again to FIG. 3, in a normal utilization of the present invention the bulk material 42 is typically fed to the drilling machine through a conventional "hugger" (not shown) that advances the material at a selected rate, as determined the output signal derived from the pivotal position of the idler wheel 44. At the same time the drum means is rotated about its axis 36 by a variable speed motor attached to the shaft 88. The speed of this motor is typically controlled by an output signal derived from the pivotal position of the second idler wheel 52. In this manner, the bulk material moves at a proper speed so that it hugs the periphery 48 of the drum means 34. In a preferred embodiment, spring-loaded guide rollers 146 supported on bracket 148 urge the gasket material against the periphery of the drum means during drilling. Typically the periphery of these guide rollers is contoured to conform to a configuration of the gasket (or other) material opposite that in contact with the drum means. As the drum means is rotated by this shaft and motor, the drilling units are moved in their appropriate radial slots 104 whereby drilling is achieved at the selected positions along the bulk material. Lubrication and cooling is provided by the jets of water, and the solid debris and waste water are caught below the drum means where the water is separated to be disposed in a drain. Alternately, the water could be reused if sufficient solids are removed. Vent openings of controlled sizes and spacing can be produced in gasket bulk material with linear speeds of at least 150 feet per minute with the machine described above. Little, if any, scrap gasket material is created unless there is a defect in the gasket material itself. Also, since components operate at a generally slow speed without any abrupt change in direction, there is very little maintenance that is required on this machine.

From the foregoing, it will be understood by persons skilled in the art that a very satisfactory device has been developed for the formation of vent openings of uniform size and spacing in continuous gasket material. Furthermore, this type of rotary drilling machine can be utilized for many types of continuous strip bulk materials that can be made to travel along the periphery of the drum. Thus, the device will have many applications in production drilling of such material. While the machine is described as having the drum means rotating about a substantially horizontal axis, this is not a requirement and a substantially vertical axis could be used. Although certain specific sizes and construction details are given herein, these are for illustration and are not intended to limit the present invention. Rather, the invention is to be limited only by the appended claims and their equivalents.

We claim:

1. A machine for the drilling of holes of selected uniform size and selected uniform spacing in a moving continuous strip base material, which comprises:

a frame means;

a rotatable drum means adjustably mounted on said frame means, said drum means provided with a substantially circular periphery for carrying said strip base material on a selected portion thereof, said drum means provided with radial openings at positions along said periphery corresponding to said spacing of said holes, said drum means further provided with radial slots directed toward said openings;

means for rotating said drum means at a selected angular speed around an axis to produce a selected linear speed of said periphery;

means for holding a surface of said strip base material against said selected portion of said periphery of said drum means;

a plurality of drill units mounted on said drum means, said drill units each associated with one of said slots in said drum means, said drill units including a drill bit for said selected size hole oriented with selected of said radial openings;

means associated with each said drill units for rotating said drill bits; and means for moving said drill units in a selected sequence in a radial direction related to said axis whereby selected ones of said drill bits engage said strip base material against said selected portion of said periphery to drill said holes, and whereby other selected ones of said drill bits are withdrawn from said strip base material to permit withdrawal of said strip base material from said periphery.

2. The machine of claim 1 wherein said means for holding said surface of said strip base material against said periphery includes tensioning means whereby said strip base material is frictionally engaged with said periphery to thereby be moved as said drum means is rotated.

3. The machine of claim 2 wherein said tensioning means includes guide means and idler wheel means mounted on said frame means proximate said drum means, said strip base material passing along a surface of said idler wheel means, said idler wheel means being provided with pivotal biasing means to produce tension in said strip base material.

4. The machine of claim 3 wherein said pivotal biasing means includes means for generating a signal to control rotational speed of said means for rotating said drum means.

5. The machine of claim 1 wherein said drill units include a drill motor means for rotating said drill bit and a holder for releasably securing said drill motor means in a radial orientation whereby said drill bit is oriented toward said opening in said periphery of said drum means.

6. The machine of claim 1 wherein said drum means includes a disk plate member having a first face, an opposite face and a peripheral edge, and a peripheral hoop member attached to said peripheral edge of said plate member, said openings being provided in said hoop member and said radial slots being provided in and extending through said disk plate member.

7. The machine of claim 6 wherein said means for moving each of said drilling units comprises:

a non-rotating cam plate means mounted from said frame means and spaced proximate said opposite face of said disk plate member, said cam plate provided with a cam surface facing said opposite face;

an arm member extending through one of said slots in said disk plate member, one end of said arm member attached to said holder for said drill motor proximate said first face of said disk plate member;

an operator member positioned between said disk plate member and said cam plate, having one end attached to said arm member, and slidably attached to said opposite face of said disk plate member with a linear bearing means; and a cam follower attached to said operator member for engagement with said cam surface of said cam plate for producing radial movement of said operator member and thereby said radial movement of said drilling units.

8. The machine of claim 6 wherein said means for rotating said drum means includes housing means, a shaft means rotatably mounted in said frame means, said disk plate member being attached to said shaft means to rotate therewith, said shaft means being provided with a hub means proximate said first face of said disk plate member, said housing means provided with means to select an angular relationship between said shaft means and said frame means.

9. The machine of claim 8 wherein said drill motor means is an air driven motor, and air is supplied to said motor through a passageway extending through said shaft means to said hub means, and through a flexible hose means connected between said hub means and said air driven motor.

10. The machine of claim 8 further comprising water supply means for directing a flow of water to proximate said openings in said periphery of said drum means, said water supply means comprising:

a further passageway extending through said shaft means to said hub means; and tubing means having one end connected to said hub means for conveying said water from said hub means to proximate said openings.

11. The machine of claim 1 further comprising collection means mounted from said frame means for collecting debris produced by drilling said holes in said strip base material.

12. The machine of claim 1 wherein said periphery of said drum means has a transverse contour approximating a transverse contour of said strip base material in contact therewith.

13. A machine for the drilling of holes of selected uniform size and selected uniform spacing in a moving continuous strip base material, which comprises:

a frame means;

a rotatable drum means adjustably mounted on said frame means, said drum means including a disk plate member having a first face, an opposite face and a peripheral edge, said drum means further including a hoop member releasably attached to said peripheral edge of said plate member, said hoop member provided with radial openings at positions along a peripheral surface corresponding to said spacing of said holes, said plate member provided with radial slots directed toward said openings in said hoop member;

means for rotating said drum means at a selected angular speed around an axis to produce a selected linear speed of said peripheral surface of said hoop member;

means for frictionally holding a surface of said strip base material against a selected portion of said peripheral surface of said hoop member including guide means and idler wheel means proximate said drum means, said strip base material passing along a surface of said idler wheel means, said idler wheel means being provided with pivotal biasing means to produce tension in said strip base material;

a plurality of drill units mounted on said disk plate of said drum means, said drill units each associated with one of said slots in said disk plate, said drill units including a drill bit for said selected size hole oriented with selected of said radial openings in said hoop member, an air-driven motor for rotating said drill bit, and holder means for releasably holding said air-driven motor in a radial orientation with said opening; and means for moving said drill units in a selected sequence in a radial direction related to said axis whereby selected ones of said drill bits engage said strip base material in contact with said selected portion of said peripheral surface of said hoop member to drill said holes, and whereby other selected ones of said drill bits are withdrawn from said strip base material to permit withdrawal of said strip base material from said peripheral surface of said hoop member.

14. The machine of claim 13 wherein said pivotal biasing means includes means for generating a signal to control rotational speed of said means for rotating said drum means.

15. The machine of claim 13 wherein said means for moving said drilling units sequentially in a radial direction comprises:

a non-rotating cam plate means mounted from said means for rotating said drum means and spaced proximate said opposite face of said disk plate member, said cam plate provided with a selected cam surface facing said opposite face;

an arm member extending through one of said slots in said disk plate member, one end of said arm member attached to said holder for said drill motor proximate said first face of said disk plate member;

an operator member positioned between said disk plate member and said cam plate means having one end attached to said arm member, and slidably attached to said opposite face of said disk plate member with a linear bearing means; and a cam follow attached to said operator member for engagement with said cam surface of said cam plate means for producing radial movement of said operator member and thereby said radial movement of said drilling unit.

16. The machine of claim 13 wherein said means for rotating said drum means includes a housing means and a shaft means rotatably mounted in said housing, said disk plate member being attached to said shaft means to rotate therewith, said shaft means being provided with a hub means proximate said first face of said disk plate member, said housing means provided with means to select an angular relationship between said shaft means and said frame means, said shaft means further provided with a air passageway for conveying air for use in rotating said drill motors to said hub means and to flexible tubing connecting said drill motors to said hub means.

17. The machine of claim 13 further comprising water supply means for directing a flow of water to proximate said openings in said hoop member of said drum means, said water supply means comprising:

a further passageway extending through said shaft means to said hub means; and tubing means having one end connected to said hub means for conveying said water from said hub means to proximate said openings.

18. The machine of claim 13 wherein said peripheral surface of said hoop member has a transverse contour approximating a transverse contour of said strip base material in contact therewith.

19. A machine for the drilling of holes of selected uniform size and selected uniform spacing in a moving continuous strip base material, which comprises:

a frame means;

a rotatable drum means mounted on said frame means, said drum means including a disk plate member having a first face, an opposite face and a peripheral edge, said drum means further including a hoop member releasably attached to said peripheral edge of said plate member, said hoop member provided with radial openings at positions along a peripheral surface corresponding to said spacing of said holes, said plate member provided with radial slots directed toward said openings in said hoop member;

means for rotating said drum means about an axis at a selected angular speed, said means including a housing means, a shaft means rotatably mounted in said housing means, said disk plate member being attached to said shaft means to rotate therewith, said shaft means being provided with a hub means proximate said first face of said disk plate member, said housing means having means to select an angular relationship between said shaft means and said frame means, said shaft means further provided with an air passageway for conveying air to said hub means;

means for frictionally holding a surface of said strip base material against a selected portion of said peripheral surface of said hoop member including guide means and idler wheel means mounted on said frame means proximate said drum means, said strip base material passing along a surface of said idler wheel means, said idler wheel means being provided with pivotal biasing means to produce tension in said strip base material, said pivotal biasing means including means for generating a signal to control rotational speed of said means for rotating said drum means;

a plurality of drill units mounted on said first face of said disk plate member, said drill units including a drill bit for said selected size hole oriented with selected of said radial openings in said hoop member, an air-driven motor for rotating said drill bit, holder means for releasably holding said air-driven motor in a radial orientation with said opening, and a flexible tubing connecting said motor to said hub means to convey air from said hub means to said motor; and means for moving said drill units in a selected sequence in a radial direction related to said axis whereby selected ones of said drill bits engage said strip base material in contact with said selected portion of said peripheral surface of said hoop member to drill said holes, and whereby other selected ones of said drill bits are withdrawn from said strip base material to permit withdrawal of said strip base material from said peripheral surface of said hoop member, said means for moving said drill units including (a) a non-rotating cam plate means mounted from said housing means and spaced proximate said opposite face of said disk plate member, said cam plate means provided with a cam surface directed toward said opposite face, said cam surface selected to provide said sequential radial movement of said drilling units, (b) a plurality of arm members, one extending through each one of said slots in said disk plate member, one end of each of said arm members attached to one of said holders of said air-driven motors, (c) operator members positioned between said disk plate member and said cam plate means, one end of each of said operator members attached to one of said arm members, each of said operator members slidably attached to said opposite face of said disk plate member with a linear bearing means, and (d) a plurality of cam followers, one attached to each of said operator members for engagement with said cam surface for producing radial movement of said operator members and thereby said radial movement of said drilling units.

20. The machine of claim 19 wherein said periphery of said drum means has a transverse contour approximating a transverse contour of said strip base material in contact therewith, and further comprises roller wheels in contact with a surface of said strip base material opposite said surface in contact with said peripheral surface of said hoop member, said roller wheels mounted on said housing means for maintaining said strip base material firmly against said peripheral surface of said hoop member during drilling of said holes in said strip base material.

* * * * *